United States Patent [19]
Ayres

[11] 3,915,005
[45] Oct. 28, 1975

[54] THERMOMETER WITH VARIABLE VOLUME BULB

[75] Inventor: Waldemar A. Ayres, Rutherford, N.J.

[73] Assignee: Becton, Dickinson and Company, East Rutherford, N.J.

[22] Filed: Feb. 27, 1974

[21] Appl. No.: 446,348

[52] U.S. Cl. ................................................. 73/371
[51] Int. Cl.² .......................................... G01K 5/22
[58] Field of Search .......... 73/371, 373, 368, 368.4; 137/511, 525

[56] References Cited
UNITED STATES PATENTS

| | | | |
|---|---|---|---|
| 700,403 | 5/1902 | Block | 137/525 X |
| 2,652,726 | 9/1953 | Gotthart | 73/371 |
| 2,712,237 | 7/1955 | Margolis | 73/371 |
| 2,941,544 | 6/1960 | Peras | 137/525 |

Primary Examiner—Charles A. Ruehl
Attorney, Agent, or Firm—Kane, Dalsimer, Kane, Sullivan and Kurucz

[57] ABSTRACT

A disposable, clinical thermometer is provided comprising an elongated tube formed of a transparent material. The tube has a closed top end and an open bottom end and a bore extends longitudinally through the tube. The tube has a first portion extending from the top end toward the bottom end and a second portion. Temperature indicating indicia are disposed in a scale along the tube adjacent the first portion. Closure means are disposed about the tube open bottom end. The closure cooperates with the bore second portion in defining a reservoir for a temperature expansible fluid. The closure is longitudinally shiftable along the tube from a first position, wherein the reservoir has a first volume, to a second position to reduce the volume of the reservoir. A normally closed valve means is interposed in the bore between the first and second portions. The valve means is openable by the hydrostatic pressures developed by the fluid when the fluid is warmed to a temperature within a range set forth on the scale and the reservoir closure is in the second position.

6 Claims, 1 Drawing Figure

U.S. Patent    Oct. 28, 1975    3,915,005
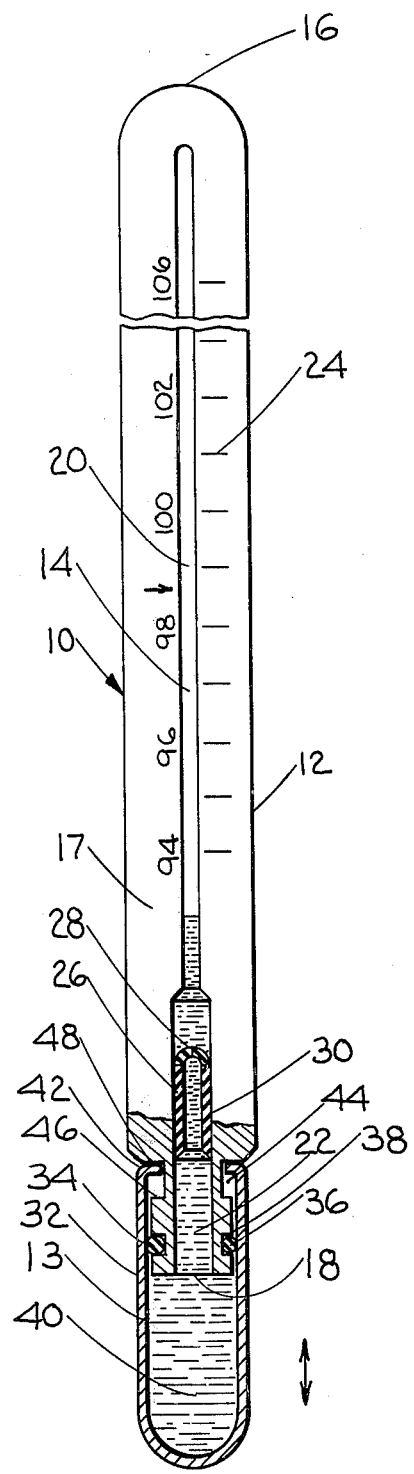

THERMOMETER WITH VARIABLE VOLUME BULB

BACKGROUND OF THE INVENTION

The present invention relates to thermometers and more particularly to a clinical thermometer.

For years, the standard clinical thermometer has comprised a glass tube having a constricted lumen in which a column of mercury could expand upon heating. Difficulties associated with reading and "shaking down" such thermometers are well known. Further, the constituent materials of such thermometers, mainly glass and mercury, are inherently dangerous, requiring that the thermometer be shipped, stored and used with considerable care. In addition, the manufacture of such mercury thermometers requires the use of relatively costly materials and is a time consuming procedure. For this reason, it has not been economically feasible to treat such thermometers as disposable items which can be discarded after a single use.

On the other hand, mercury clinical thermometers have many advantages which justify their present extensive usage. They provide accurate temperature readings and hold their maximum to facilitate reading of the thermometer. Further, they require no special refrigeration or handling prior to use. In addition, the manner of reading such thermometers, while possibly difficult to some, has become accepted and medical technicians and personnel are familiar and comfortable with such devices.

In view of the above, it is the principal object of the present invention to provide an improved, clinical thermometer which retains most of the advantages of mercury thermometers without the disadvantages inherent in the use of a glass-mercury thermometer.

A further object is to provide an improved, clinical thermometer which, while similar in construction to the glass-mercury thermometer, can be rendered easier to read. A still further object is to provide such a thermometer, the construction of which lends itself to quantity production at reduced manufacturing costs and with relatively inexpensive materials so as to render the thermometer economically feasible to be discarded after a single use.

SUMMARY OF THE INVENTION

The above and other beneficial objects and advantages are attained in accordance with the present invention by providing a disposable, clinical thermometer including an elongated tube formed of a transparent material. The tube has a closed top end and an open bottom end and a bore extends longitudinally through the tube. The bore has a first portion extending from the top end toward the bottom end and a second portion. Temperature indicating indicia are disposed in a scale along the tube adjacent the first portion. Closure means are disposed about the tube open bottom end. The closure cooperates with the bore second portion in comprising a reservoir for a temperature expansible fluid. The closure is longitudinally shiftable along the tube from a first position wherein the reservoir has a first volume to a second position to reduce the volume of the reservoir. A normally closed valve means is interposed in the bore between the first and second portions. The valve means is openable by the hydrostatic pressures developed by the fluid when the fluid is warmed to a temperature within the range set forth on the scale and the reservoir closure is in the second position.

BRIEF DESCRIPTION OF THE DRAWINGS

The accompanying drawing is a schematic plan representation of an improved, clinical thermometer in accordance with the present invention.

DETAILED DESCRIPTION OF THE PREFERRED EMBODIMENT

In the accompanying drawing, a thermometer 10 is shown comprising an elongated tube 12 formed of a suitable transparent material such as plastic. A bore 14 extends through the tube. The tube has a closed top end 16 and an open bottom end 18. The bore 14 may be considered as comprising a first portion 20 extending downwardly from adjacent the closed top end and a second portion 22 extending upwardly from the open bottom end of the tube. At the upper end of the tube, the tube first portion 20 is substantially a capillary. The conventional temperature indicating indicia are provided along the capillary on a scale 24 ranging between 94°F and 106°F.

The tube bore first and second portions are separated by a one-way valve device 26. The valve consists of a resilient rubber barrier in the form of a substantially hemispherical dome blocking the bore. A resilient aperture extends through the barrier. Under normal conditions, the resiliency of the plug serves to close the aperture thereby providing a barrier between the bore first and second portions. If sufficient pressure is applied to the resilient aperture from the bottom end of the bore (i.e. from within the hemispherical dome) the resiliency of the barrier is overcome thereby opening the aperture. On the other hand, if pressure is applied to the barrier from the top end of the bore (i.e. from outside the dome) the aperture tends to close even tighter. Thus, the normally closed barrier acts as a one-way valve. For ease of manufacturing, the barrier 28 may be provided as a sub-assembly on a rigid tube 30 which sealingly engages the bore interior.

The open bottom end of tube 12 is closed by an elongated closure or cap 32 which has portions 34 that ride along the outside of the lower portion of the tube. An "O" ring 36 seated in a recess 38 insures a tight, sealing engagement between the cap 32 and tube 12. The cap 32 and the second portion 22 of bore 14 together cooperate to define a reservoir 40 containing a temperature expansible fluid. Any fluid having a relatively high thermal coefficient of volumeric expansion could be used. A nontoxic fluid is preferred so that in the event of breakage of the thermometer, any leakage will be harmless. If desired, a colorant may be added to the fluid so as to enhance its contrast with the background and markings of scale 24 and thus improve the readability of the thermometer.

The open edge 42 of cap 32 is turned radially inwardly and is retained in a groove 44 provided in tube 12. The cap is thus free to shift longitudinally within the confines defined by the side walls of groove 44 with the O-ring 36 maintaining sealing relationship between the cap and tube. The cap 32 may be formed of a material such as aluminum having excellent heat conduction characteristics. The cap of the thermometer shown herein corresponds to the "bulb" of the conventional mercury thermometer, which is placed into a patient. In this connection, as compared to the conventional glass thermometer, the aluminum cap may be clamped by the patient's teeth without danger of cracking and producing shards of glass as sometimes happens with glass thermometers.

As should be apparent, when cap 32 is in a first position so that flange 42 is adjacent the lower edge 46 of the groove, the reservoir assumes a first volume. Similarly, when the cap is shifted to a second position so that the flange 42 is adjacent the top edge 48 of the groove, the reservoir assumes a second, reduced volume. The first volume is greater than the second volume by an amount at least equal to the amount that the expansible fluid will expand when subjected to its top acceptable temperature during transportation or storage prior to use. For example, 115°F may be adopted as the maximum temperature the thermometer would be expected to tolerate and still be operational. This is in line with the practice now followed with regard to mercury-glass thermometers where personnel are cautioned that subjecting such thermometers to temperatures about 115°F could burst the bulbs and ruin the glass-mercury thermometers.

The volume of the present thermometer, when the cap is in its second position, is such that the expansible fluid will all be below the fever temperature range on the scale 24, when exposed to ordinary ambient temperatures.

The thermometer is shipped and stored with the cap in its first position so that all the fluid is contained within the reservoir. Immediately prior to use, the user of the thermometer shifts the cap toward the closed end by sliding it upwardly. The bulb is then placed in a patient's body (orally or rectally) whereafter the patient's body temperature causes the fluid to expand. The hydrostatic pressure of the expanding fluid opens valve 28 thereby permitting fluid to flow into the capillary of the bore first portion. When temperature equilibrium is attained, hydrostatic pressure on the valve relaxes so that the resilient aperture closes thereby retaining the maximum temperature reading after the thermometer is taken out of the patient.

Thus, in accordance with the above, the aforementioned objects are effectively attained.

Having thus described the invention, what is claimed is:

1. A disposable, clinical thermometer comprising: an elongated tube formed of a transparent material; a bore extending longitudinally through said tube, said bore having a first portion and a second portion; temperature indicating indicia disposed in a scale along said tube adjacent said first portion; a bottom end of said tube; a reservoir connected to said tube bottom end, said reservoir including said bore second portion; means for varying the volume of said reservoir from a first volume to a reduced second volume; a temperature expansible fluid disposed in said reservoir; and normally closed valve means in said bore interposed between said first and second portions, said valve means being operable by the hydrostatic pressures developed by said fluid when said fluid is warmed to a temperature within the range set forth on said scale and said reservoir is set at said second volume.

2. The thermometer in accordance with claim 1 wherein said tube has a closed top end and an open bottom end and said reservoir further comprises closure means disposed over said tube bottom end, said means for varying the volume of said reservoir mounting said closure means on said tube bottom end for sliding sealing engagement therewith, said closure means being longitudinally shiftable along said tube from a first position to a second position whereby the volume of said reservoir is varied from said first volume to said second volume.

3. The thermometer in accordance with claim 1 wherein said bore first portion comprises a capillary.

4. The thermometer in accordance with claim 1 wherein said valve means includes a dome-shaped resilient barrier closing said bore, said barrier having a resilient aperture extending therethrough.

5. The thermometer in accordance with claim 1 wherein said closure is formed of a metal of relatively high thermal conductivity.

6. The thermometer in accordance with claim 1 wherein a colorant is added to said temperature expansible fluid.

* * * * *